Feb. 13, 1923.

W. E. GREENAWALT

ELECTROLYTIC APPARATUS

Filed June 11, 1920

1,444,787

2 sheets-sheet 1

INVENTOR
William E Greenawalt

INVENTOR
William E Greenawalt

Patented Feb. 13, 1923.

1,444,787

UNITED STATES PATENT OFFICE.

WILLIAM E. GREENAWALT, OF DENVER, COLORADO.

ELECTROLYTIC APPARATUS.

Application filed June 11, 1920. Serial No. 388,343.

*To all whom it may concern:*

Be it known that I, WILLIAM E. GREENAWALT, a citizen of the United States, residing in the city and county of Denver and State of Colorado, have invented certain new and useful Improvements in Electrolytic Apparatus, of which the following is a specification.

The apparatus is designed more particularly for the purpose of electrolyzing galena for the production of hydrogen sulphide and sponge lead. The hydrogen sulphide is intended to be used in connection with my electrolytic copper extraction process, as described in my co-pending applications, Serial No. 15,583, filed March 19, 1915, and Serial No. 239,255, filed June 10, 1918, although it is not intended to limit the use of the apparatus in any way nor to limit the application of the products of electrolysis.

If powdered galena is placed in contact with the cathode in an electrolyte of dilute sulphuric acid, and electrolyzed, hydrogen and hydrogen sulphide are evolved and the galena is converted into metallic lead in the form of a sponge. There has been considerable difficulty in practically carrying out this process on account of the nature of the gas evolved. I overcome these difficulties by a modification of the apparatus disclosed in my co-pending applications, Serial No. 145,884, filed Feb. 1, 1917, and Serial No. 231,534, filed April 29, 1918. On account of the nature of the hydrogen sulphide gas, it is very necessary that there should be no escape of the gas from the cell to contaminate the atmosphere of the cell room.

Figure 1:
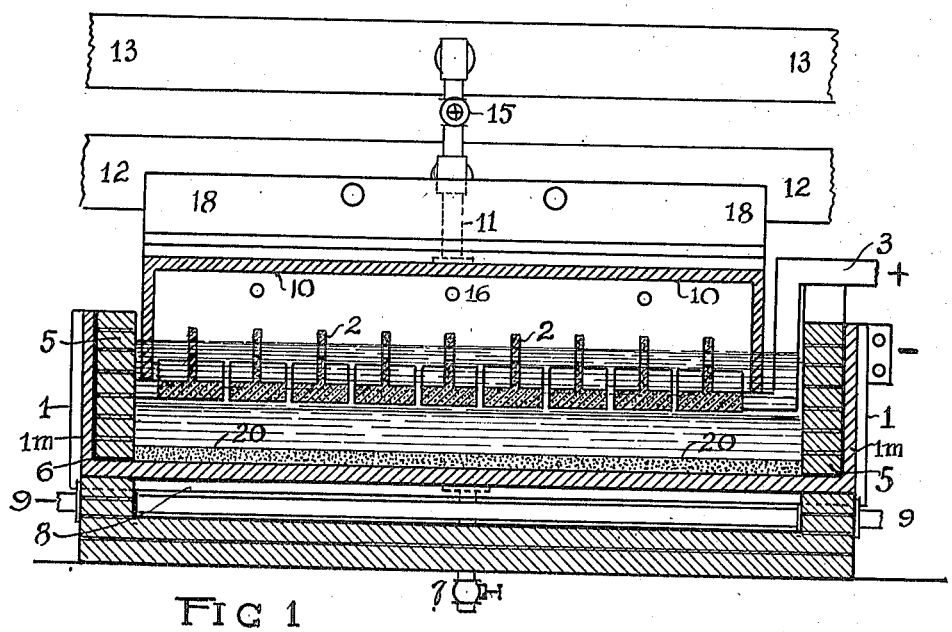
Figure 2:
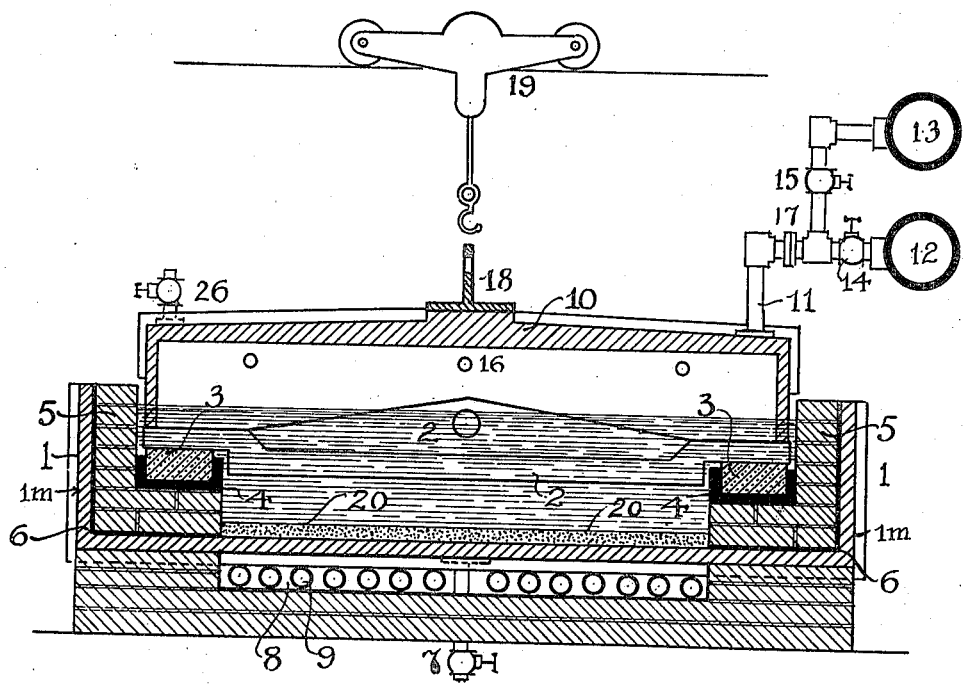
Figure 3:
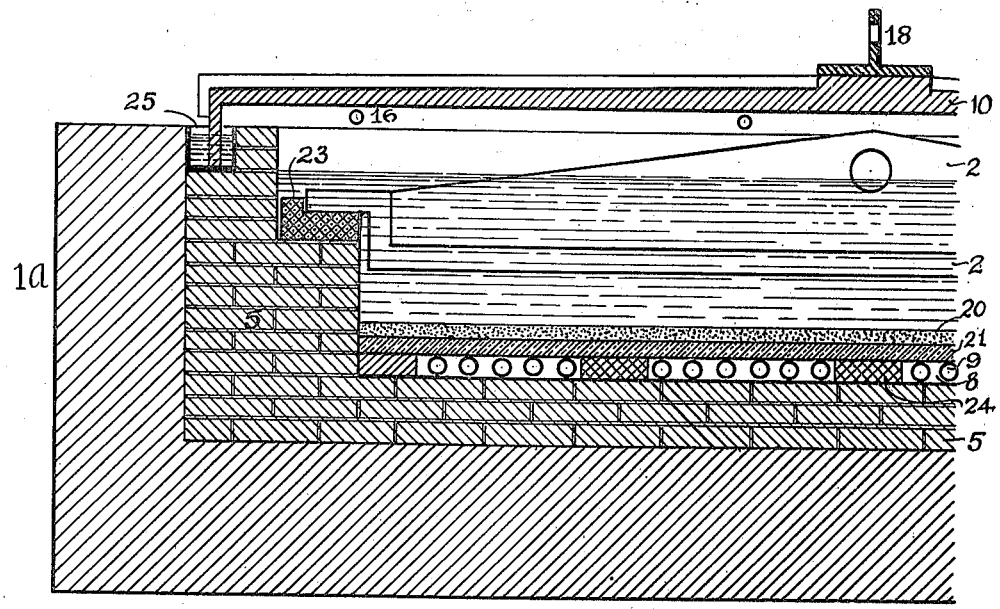

The invention is best described by referring to the accompanying drawings, in which Fig. 1 shows a longitudinal section of the apparatus; Fig. 2 a cross section; Fig. 3 a detail cross section of a modified apparatus; and Fig. 4 a detail cross section of another modification.

Referring more particularly to Figs. 1 and 2, 1 is a tank, or lower section, adapted to contain the electrolyte and the electrodes. The lower section is preferably composed of a metal tank $1^m$, which, in the electolysis of galena, may conveniently be made of cast lead, and which will also serve as the cathode. The interior of the lead tank may be lined with acid resisting brick 5, which also acts as an electric insulator. Between the brick and the sides of the lead lined tank is an additional and a more perfect insulator 6, which may be made of sheets of glass, rubber, or earthenware, and which is also acid proof. Resting on an off-set in the brick is the positive conductor 3, which is also, preferably, insulated by a material 4, such as glass or earthenware, and which is also acid proof. Resting on these positive conductors 3, are the anodes 2, which may be removable, and which make electrical contact with the electrical conductors 3, by their weight, and which are spaced apart to allow the gases liberated by the electrolysis to ascend between the sections composing the anode, as a whole.

10 is a hood, cover, or upper section, engaging the lower section and forms a sealed chamber therewith. The electrolyte, in Figs. 1, 2, and 4, acts as a sealing liquid when the projecting sides of the upper section 10 are placed in position.

The gas outlet pipe 11, in the upper section, communicates with two gas mains, 12 and 13. The gas liberated during electrolysis, flows into the gas main 12, and is conducted to the point of use by means of an exhauster. The valve 15 is supposed to be closed. When the electric current is disconnected, the generation of the gas ceases, and before the upper section is removed it is desirable to thoroughly remove the residual gas without diluting the gas going into the main 12; it is also desirable to wash the sponge lead free from residual acid solution after the lower section has been drained of the electrolyte. To do this, the valve 14 is closed and valve 15 opened. The ports 16 are also opened. An exhauster at the other end of the main 13 creates a suction inwardly and effectively removes all the residual gas in the hood. The electrolyte is drained through the outlet 7 and may be stored for re-use. A water sprayer is inserted in the hood through the ports 16, and the sponge lead, as well as the entire interior of the apparatus, is thoroughly washed free from both the acid and the gas. The hood, or upper section, may then be removed and the interior of the cell exposed.

It will usually be desirable to have a hot, or at least a warm, electrolyte. The electrolyte may be heated by steam pipes 9, in a chamber 8, directly below the cathode.

Gas or liquid may be introduced through the inlet 26 while the cell is in operation, without admitting air. It may be desirable to admit a gas into the upper section of the apparatus to mix with the gas liberated by the electrolysis.

The operation of the apparatus, in the electrolysis of galena, may be briefly described as follows: The galena, ground to from 40 to 100 mesh, is charged on the cathode and spread evenly over the bottom, say, 1.25 inches thick, as indicated by 20, in the drawings. The anodes 2, are then put in position by the travelling hoist 19, and arranged with a space between them of about 0.10 inch to 0.25 inch, for the escape of the gas. A dilute solution of sulphuric acid, preferably heated, is then flowed in, as the electrolyte, to a sufficient depth to make a liquid seal when the upper section is in position. The upper section is then placed in position, and the pipe connections made at 17, with the gas mains 12 and 13. The valve 15 is supposed to be closed and the valve 14 open. The ports 16 are also supposed to be closed. The current is then turned on, and the action begins. Hydrogen sulphide is formed by the nascent hydrogen liberated at the cathode combining with the sulphur of the galena, while the galena, being deprived of its sulphur, is converted into the metallic lead in the form of a sponge metal. The current density is, preferably, about 50 amperes per sq. foot. Under these conditions it will take about seven days to fully electrolyze the entire charge of galena. This current density will largely serve to keep the electrolyte at a fairly warm temperature, but if it is not sufficiently heated by the current, additional heating may be made through the steam or hot air pipes 9 in the chamber 8, under the cathode. The hydrogen sulphide escapes through the outlet pipe 11, through the pipe 14 into the gas main 12, through which it is conducted to the point of use by means of an exhauster located at the other end of the main. This exhauster always maintains a slight suction inwardly, so that even if there should be small leaks, no gas would escape, and the surrounding atmosphere could not be contaminated with the gas. When the operation is finished, the electric current is turned off, valve 14 closed, and valve 15 opened, as also the ports 16, so that there is a free circulation of air through the interior of the cell, and the air and residual gas are expelled into the atmosphere outside of the building by an exhauster at the other end of the gas main 13. The valve 7 is opened and the cell drained of the electrolyte, which may be transferred to another cell, or stored for re-use. A spray nozzle is then inserted into the ports 16 and the interior of the cell and the sponge lead thoroughly washed. Enough water is added to the electrolyte in this way to make up for the loss due to evaporation during electrolysis, so that practically all of the acid is recovered for reuse. After the cell has been washed in this way for a few minutes, the cover is removed by the travelling hoist 19, and placed on another cell, or stored. The anodes are similarly removed to another cell, which can then be put in operation while the first cell is being emptied and re-charged. The sponge lead, which has increased to several times the volume of the original galena, is then removed, and may be further treated, as desired. If the galena contains precious metals, these may be recovered from the galena before electrolysis by any of the well known methods, or from the sponge lead, after electrolysis. The extraction of the precious metal values from a lead sponge resulting from the electrolytic decomposition of a concentrated galena, seems to offer a new, though limited field for the profitable exploitation of galena ores carrying recoverable values in the precious metals. After the sponge lead is removed, the cell is again charged, and the operation repeated, as described.

The process is intermittent, and it is for this reason that it will usually be desirable to have one more lower section, or tank, than the upper sections, or hoods, so that the anodes and hood, removed from one cell, may be placed on another which had previously been otherwise made ready to operate. However, the removing of the sponge lead and recharging with galena does not take long, and there would not be a great deal of time lost in replacing the anodes and hood on the cell from which they were removed.

The anode contacts with the electrical conductors 3, are submerged, as shown in the drawings, but if the electrolyte gets low, or if desired, the contact may be made above the surface of the electrolyte, while the lower portion of the anode is submerged. The weight of the anodes will suffice to make a good electrical contact, and the contacts can always be inspected when the anodes are removed. In this way it is not likely that any unusual contact difficulty will develop, especially in an acid electrolyte and especially when the electrical contact is submerged.

The modification in Fig. 3, shows the sealing liquid entirely separate from the electrolyte. This prevents any possible escape of gas, even in the minute amounts possible through the small exposure of electrolyte around the edges, as shown Figs. 1, 2, and 4. It also makes the anodes entirely independent of the hood, or upper section.

Figure 4:
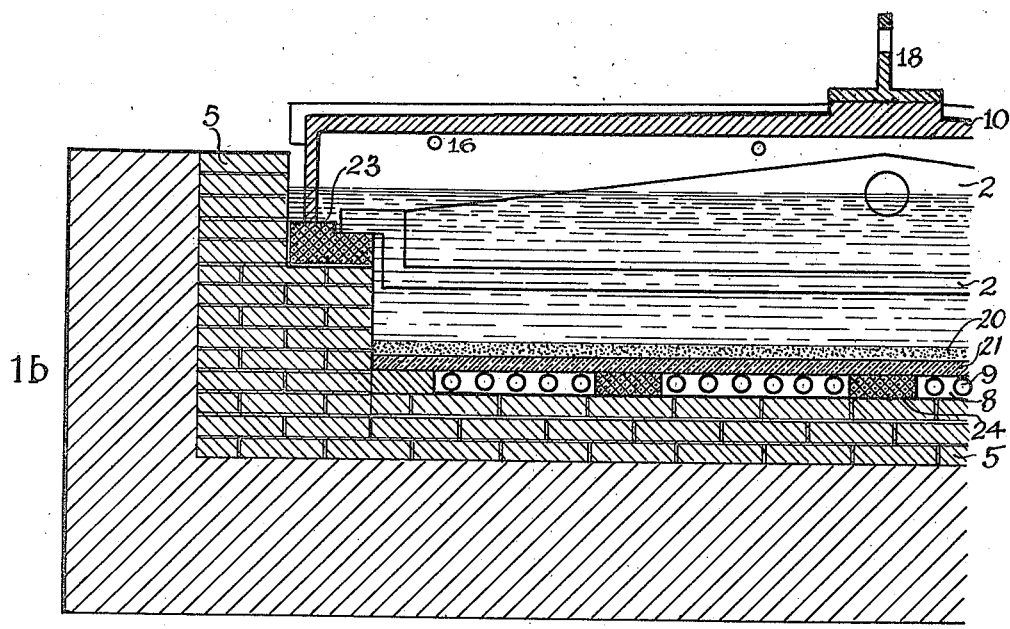

The modification shown in Fig. 4, shows the upper section resting directly on the electric conductor, instead of on the ends of the anodes, as shown in Fig. 2. The upper section will usually be made of metal; in the electrolysis of galena in an acid electrolyte it will be made of lead, cast, in sections, and bolted together, with a strong T iron 18 bolted to it, to strengthen it and to facilitate the shifting of the hood from cell to cell. In Fig. 4, the electrical connection between the dynamo and the conductor 23 could, of course, be made through the cast lead hood. Similarly, in Fig. 2, the electrical connection may be made through the hood instead of through the prolongation of the conductor bar 3 outside of the tank.

In Figs. 3 and 4, the cathode 21 may be composed of cast lead sheets, resting on conductors 24, and making electrical contact therewith. These cast lead cathode sheets may also be removed and inspected as desired without affecting the electrical conductors. The pipes 9, in the chamber under the cathodes will, in that event, be made of lead, and would be unaffected by the electrolyte.

In Figs. 3 and 4, the outside portion of the lower section is supposed to be made of concrete.

I claim:

1. In electrolytic apparatus having a chamber adapted to contain horizontal electrodes of both polarities in vertically spaced relation, removable upper electrodes resting on electrical conductors within the chamber and making electrical contact therewith when so positioned.

2. In electrolytic apparatus having a chamber containing horizontal electrodes of both polarities in vertically spaced relation, removable upper electrodes contacting with electrical conductors within the chamber and making electrical connection by the contacting pressure between the conductor and the electrodes.

3. In electrolytic apparatus, a lower section adapted to contain the electrolyte and horizontal electrodes of both polarities, an upper section engaging the lower section and forming therewith a sealed chamber, of one polarity vertically disposed over horizontal electrode for allowing the gas generated by the electrolysis to escape from the electrolyte in the lower section into the space in the upper section, and means for exhausting the gas from the upper section.

4. In electrolytic apparatus, a lower section adapted to contain the electrolyte and horizontal electrodes of both polarities in vertically spaced relation, an upper section engaging the lower section and forming a sealed chamber therewith, an electrical conductor for the upper electrodes within the chamber, said upper electrodes being removable in reference to the conductor and arranged to make electrical contact with the conductor within the chamber.

5. In electrolytic apparatus, a tank adapted to contain the electrolyte, a horizontal electrode in the lower portion of the tank adapted to support the material to be treated, a series of electrode sections of the opposite polarity spanning across the tank parallel with the other electrode and making electrical contact with submerged conductors.

6. In electrolytic apparatus, a lower section adapted to contain the electrolyte and removable stationary horizontal electrodes, a removable upper section engaging the lower section and forming a sealed chamber therewith, an electrical conductor within the sealed chamber and making electrical contact with the removable stationary horizontal electrodes within the sealed chamber.

7. In electrolytic apparatus, a lower section adapted to contain the electrolyte and the electrodes of both polarities, a removable upper section engaging the lower section and forming a sealed chamber therewith, an electrical conductor of one polarity within the sealed chamber, and removable stationary horizontal electrodes of one polarity resting on the electrical conductor and arranged to make electrical connections therewith by the contact originally due to the weight of the electrodes.

8. In electrolytic apparatus, a tank adapted to contain the electrolyte, a horizontal electrode in the lower portion of the tank, horizontal electrodes in the upper portion of the tank resting on submerged supports and spanning from the support on one side of the tank to the support on the other side and arranged with gas passages for the escape of the gas formed by the electrolysis, and means for passing an electric current through the electrodes.

9. In electrolytic apparatus, a chamber adapted to contain the electrolyte and the horizontal electrodes of both polarities and to confine a gas over the electrolyte, means within the chamber to support the electrodes of opposite polarities in vertically spaced relation.

10. In electrolytic apparatus, a tank adapted to contain the electrolyte, a horizontal electrode in the lower portion of the tank, horizontal electrodes in the upper portion of the tank resting on supports at the sides of the tank and spanning from the support on one side to the support on the other side and arranged with gas passages for the escape of the gases formed by the electrolysis, a cover to said tank arranged to form a sealed chamber with the tank.

11. In electrolytic apparatus, a tank adapted to contain the electrolyte, a horizontal electrode in the lower portion of the tank, removable stationary horizontal electrodes in the upper portion of the tank resting on supports at the sides of the tank and spanning from the support on one side to the support at the other side and arranged with gas passages for the escape of the gas formed by the electrolysis, a cover to said tank arranged to form a sealed chamber with the tank, means arranged for making electrical connection between the electrical conductor and the removable electrodes within the sealed chamber formed by the tank and the cover, and means for exhausting the gas formed by the electrolysis from the sealed chamber.

12. In electrolytic apparatus adapted to contain the electrolyte and horizontal electrodes of both polarities in vertically spaced relation, upper electrodes of one polarity suspended over the lower electrodes of the opposite polarity and resting on supports submerged in the electrolyte.

13. In electrolytic apparatus, a closed tank adapted to contain the electrolyte and to confine gas over the electrolyte, stationary horizontal electrodes of one polarity in the lower portion of the tank adapted to support crushed insoluble material to be treated, stationary horizontal electrodes of the opposite polarity in vertically spaced relation with the lower electrodes supported at opposite sides of the tank and arranged to allow gas formed in the lower portion of the tank to escape into the upper portion, and means for exhausting the gas from the upper portion of the tank.

14. In electrolytic apparatus, a tank adapted to contain the electrolyte and horizontal electrodes, said electrodes being supported at the sides of the tank and spanning from one side of the electrolytic tank to the other side and arranged so as to permit the gas to escape from the underside of the electrode, and means for passing the electric current through the electrolyte and electrodes.

15. In electrolytic apparatus, a receptacle adapted to contain the electrolyte and electrodes, removable horizontal electrodes of one polarity vertically disposed over horizontal electrodes of the opposite polarity and supported at the sides of the receptacle, and means arranged for making electrical contact with an electrical conductor within the chamber at the area of support of the electrodes.

16. In electrolytic apparatus, a chamber adapted to contain the electrolyte and horizontal electrodes of both polarities in vertically spaced relation, means arranged to allow the gases liberated by the electrolysis in the lower portion of the chamber to escape into the upper portion, means at the sides of the chamber for supporting the horizontal electrodes, and means for exhausting the gases liberated by the electrolysis from the upper portion of the chamber.

17. In electrolytic apparatus, a tank adapted to contain the electrolyte and horizontal electrodes of both polarities, a gas confining cover or hood adapted to be positioned over the tank and operating to make electrical contact with the electrodes when so positioned.

18. In electrolytic apparatus, a lower section adapted to contain the electrolyte and horizontal electrodes of both polarities, upper electrodes of one polarity arranged in vertically spaced relation with the electrodes of the opposite polarity, and an upper section engaging the lower section and operating with liquid in the lower section to form a sealed chamber when so positioned.

19. In electrolytic apparatus, a lower section adapted to contain the electrolyte and electrodes, an upper section engaging the lower section and forming a sealed chamber therewith, a plurality of gas exhaust pipes communicating with the upper section and arranged so that gas from the lower section may be diverted to different pipes.

20. In electrolytic apparatus, a tank adapted to contain the electrolyte and to confine a gas over the electrolyte and adapted to contain the electrodes of both polarities in vertically spaced relation, gas exhaust pipes communicating with the chamber and arranged so that the gas from within the chamber may be diverted to different exhaust pipes, and ports arranged so that a fluid substance may be introduced into the chamber above the surface of the electrolyte.

21. In electrolytic apparatus, a lower section adapted to contain the electrolyte, the electrodes, and the electrical conductor, and an upper section engaging the lower section and operating with the lower section to form a sealed chamber and to make electrical contact with the electrical conductor in the lower section.

22. In electrolytic apparatus, a chamber adapted to contain the electrolyte and horizontal electrodes of both polarities and to confine a gas over the electrolyte, removable upper electrodes resting on an electrical conductor within the chamber and making electrical contact therewith when so positioned, and means for exhausting the gas formed by the electrolysis from the chamber.

23. In electrolytic apparatus, a lower section adapted to contain the electrolyte and horizontal electrodes of both polarities in vertically spaced relation, an upper section engaging the lower section to enclose the electrolyte and electrodes of both polarities, a liquid seal interposed between the upper section and the lower section, and means for exhausting gas from the upper section.

24. In electrolytic apparatus, a tank adapted to contain the electrolyte and stationary horizontal electrodes of both polarities in vertically spaced relation, removable upper electrodes of one polarity resting on electrical conductors and making electrical contact therewith when so positioned.

25. In electrolytic apparatus, a lower section adapted to contain the electrolyte and horizontal electrodes of both polarities in vertically spaced relation, an upper section engaging the lower section to enclose the electrolyte and electrodes of both polarities, and a liquid seal interposed between the upper section and the lower section.

26. In electrolytic apparatus, a tank adapted to contain the electrolyte, an electric conductor in the lower portion of the tank adapted to support the material to be treated and to make electrical contact therewith, removable electrodes of the oposite polarity supported at the sides of the tank and making electrical contact with electrical conductors at the points of support, a cover adapted to enclose the electrolyte and electrodes of both polarities to form a sealed chamber with the tank, and means for exhausting gas from the chamber so formed.

27. In electrolytic apparatus having a tank adapted to contain the electrolyte and a plurality of dimensioned anodes, a removable electrical conductor arranged to make electrical connection with the dimensioned anodes in the upper portion of the tank below the surface of the electrolyte.

28. In electrolytic apparatus, a tank adapted to contain the electrolyte, a horizontal electrode of one polarity in the lower portion of the tank, and horizontal electrodes of the opposite polarity in the upper portion of the tank resting on supports at the sides of the tank and spanning from the support on one side to the support on the other side.

29. In electrolytic apparatus, a tank adapted to contain the electrolyte and a plurality of dimensioned electrodes, and a removable electrical conductor supported by the electrodes and resting thereon and making electrical contact therewith when so positioned.

WILLIAM E. GREENAWALT.